United States Patent
Tsukamoto et al.

(10) Patent No.: US 9,213,909 B2
(45) Date of Patent: Dec. 15, 2015

(54) OBJECT DETECTION METHOD, OBJECT DETECTION APPARATUS, AND PROGRAM

(71) Applicant: CANON KABUSHIKI KAISHA, Tokyo (JP)

(72) Inventors: Kenji Tsukamoto, Kawasaki (JP); Kan Torii, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 13/851,837

(22) Filed: Mar. 27, 2013

(65) Prior Publication Data

US 2013/0259310 A1 Oct. 3, 2013

(30) Foreign Application Priority Data

Mar. 30, 2012 (JP) ................................. 2012-082379

(51) Int. Cl.
*G06K 9/32* (2006.01)
*G06K 9/00* (2006.01)
*G06K 9/68* (2006.01)

(52) U.S. Cl.
CPC .......... *G06K 9/3241* (2013.01); *G06K 9/00362* (2013.01); *G06K 9/6857* (2013.01)

(58) Field of Classification Search
CPC  G06K 9/00362; G06K 9/3241; G06K 9/6857
See application file for complete search history.

(56) References Cited

U.S. PATENT DOCUMENTS

| 7,881,494 | B2* | 2/2011 | Kitamura | 382/103 |
|---|---|---|---|---|
| 2006/0192784 | A1* | 8/2006 | Yamaji et al. | 345/473 |
| 2006/0204053 | A1* | 9/2006 | Mori et al. | 382/118 |
| 2007/0292019 | A1* | 12/2007 | Terakawa | 382/159 |
| 2010/0021056 | A1* | 1/2010 | Chen | 382/165 |
| 2010/0067742 | A1* | 3/2010 | Ogawa | 382/103 |
| 2010/0086175 | A1* | 4/2010 | Yokono et al. | 382/103 |
| 2011/0274315 | A1* | 11/2011 | Fan et al. | 382/103 |

FOREIGN PATENT DOCUMENTS

JP          4498296 B2       7/2010

OTHER PUBLICATIONS

Koppen, Intelligent Surveillance Systems, University of Amsterdam, Feb. 2008.*

(Continued)

*Primary Examiner* — Utpal Shah
*Assistant Examiner* — Pinalben Patel
(74) *Attorney, Agent, or Firm* — Canon USA, Inc. IP Division

(57) ABSTRACT

An object detection method includes an image acquisition step of acquiring an image including a target object, a layer image generation step of generating a plurality of layer images by one or both of enlarging and reducing the image at a plurality of different scales, a first detection step of detecting a region of at least a part of the target object as a first detected region from each of the layer images, a selection step of selecting at least one of the layer images based on the detected first detected region and learning data learned in advance, a second detection step of detecting a region of at least a part of the target object in the selected layer image as a second detected region, and an integration step of integrating a detection result detected in the first detection step and a detection result detected in the second detection step.

12 Claims, 16 Drawing Sheets

(56) References Cited

OTHER PUBLICATIONS

Thi Thi Zin, Pedestrian Detection Based on Hybrid Features Using Near Infrared Images, R&D Center of 3G Search Engine, ICIC International 2011 ISSN 1349-4198, vol. 7, No. 8, Aug. 2011.*

Lee, Body Part Detection for Human Pose Estimation and Tracking, Institute for Robotics and Intelligent Systems, IEEE Workshop on Motion and Video Computing 2007 IEEE.*

Micilotta, Detection and Tracking of Humans by Probalistic Body Part Assembly, CVSSP, University of Surrey, Guilford, UK, 2005.*

Rowley, Human Face Detection in Visual Scenes, Carnegie Mellon University, Nov. 1995.*

Gallagher, Clothing Cosegmentation for Recognizing People, Carnegie Mellon University.*

Heisele, Hierarchical Classification and Feature Reduction for Fast Face Detection with Support Vector Machines, Honda Research Institute, Jan. 2003.*

* cited by examiner

FIG. 13
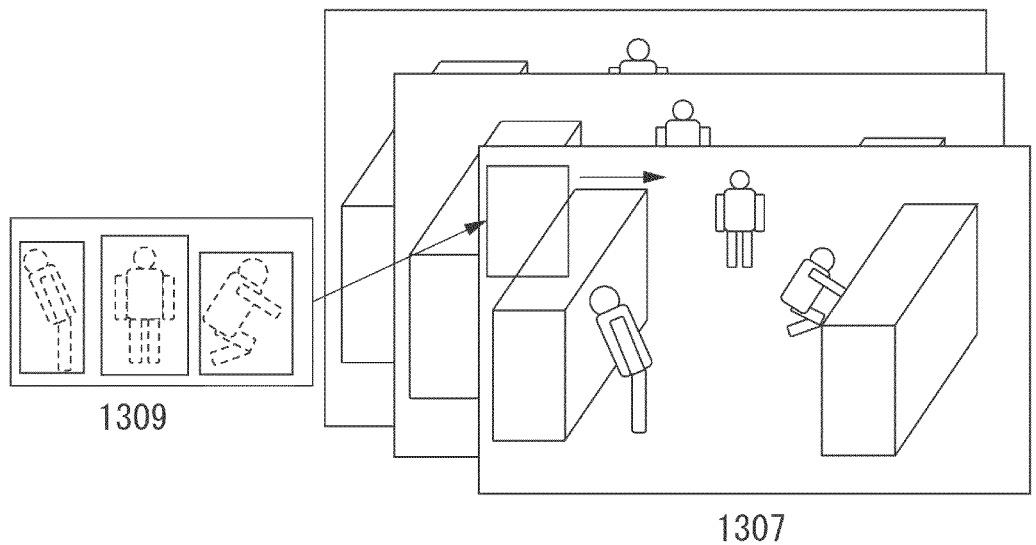
1309
1307
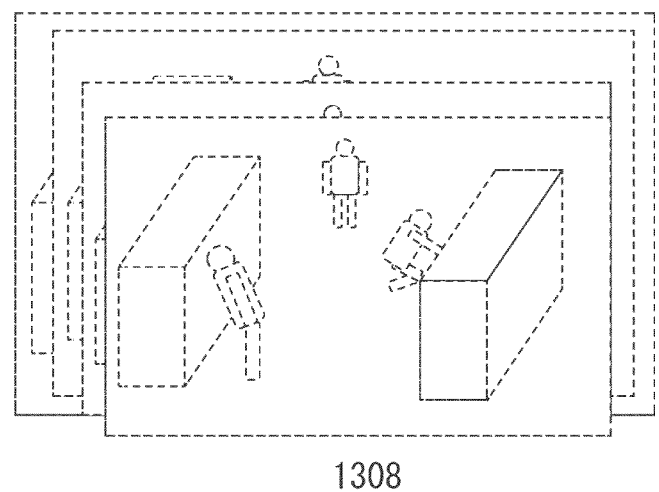
1308

FIG. 16
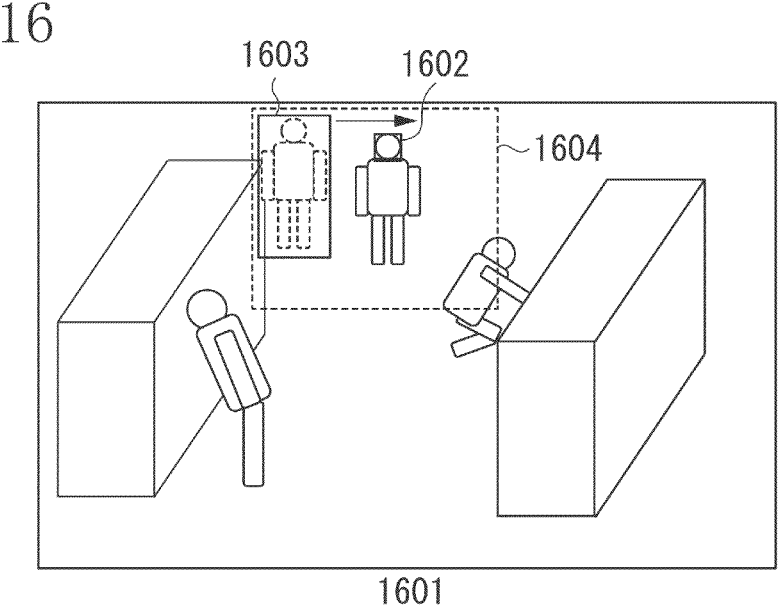
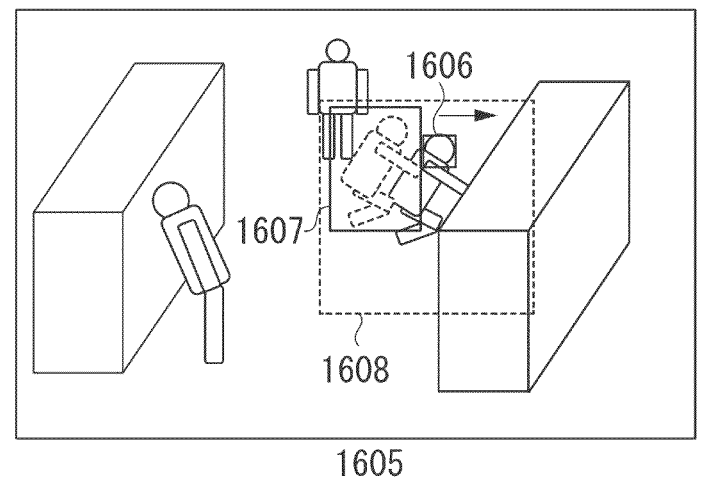
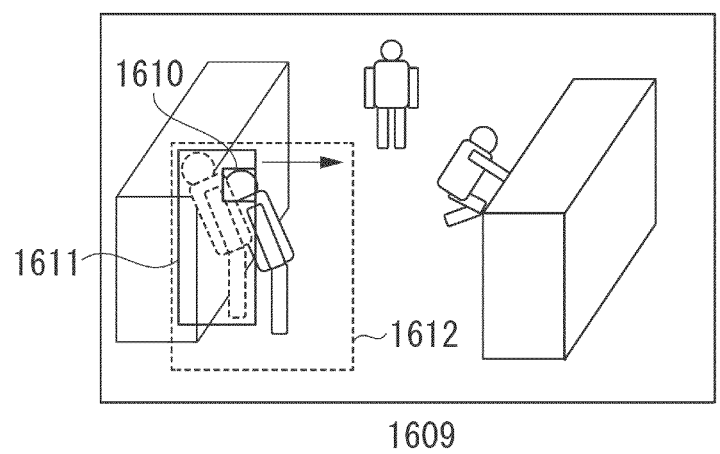

OBJECT DETECTION METHOD, OBJECT DETECTION APPARATUS, AND PROGRAM

BACKGROUND OF THE INVENTION

1. Field of the Invention

The present invention relates to a method for performing detection processing at a high speed while maintaining accuracy, and an object detection apparatus.

2. Description of the Related Art

As one of conventional methods to detect a target from an image, there is a method including performing detection processing with use of a model learned in advance, limiting a range of layers in which a target is searched for based on the detection result, and performing detection processing based on a more highly accurate model.

Japanese Patent No. 4498296 discusses a method including performing first detection on layer images, and performing second detection only on the same layer image detected from the first detection for a next input image.

However, according to the method discussed in Japanese Patent No. 4498296, a searched layer is limited to the same layer, but the same layer does not always have the highest possibility of detection for the next input image. Further, in a case where different models are used for the first detection and the second detection, a layer from which a target is highly likely detectable is not always the same layer for both the first detection and the second detection, thereby leading to a problem of a reduction in detection accuracy as a whole.

SUMMARY OF THE INVENTION

According to an aspect of the present invention, an object detection method includes an image acquisition step of acquiring an image including a target object, a layer image generation step of generating a plurality of layer images by one or both of enlarging and reducing the image at a plurality of different scales, a first detection step of detecting a region of at least a part of the target object as a first detected region from each of the layer images, a selection step of selecting at least one of the layer images based on the detected first detected region and learning data learned in advance, a second detection step of detecting a region of at least a part of the target object in the layer image selected in the selection step as a second detected region, and an integration step of integrating a detection result detected in the first detection step and a detection result detected in the second detection step.

According to exemplary embodiments of the present invention, it is possible to speed up entire processing while maintaining detection accuracy.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 illustrates a processing process in the object detection method according to the second exemplary embodiment of the present invention.

FIG. 16 illustrates a processing process in the object detection method according to the third exemplary embodiment of the present invention.

DESCRIPTION OF THE EMBODIMENTS

Various exemplary embodiments, features, and aspects of the invention will be described in detail below with reference to the drawings.

An object detection method according to a first exemplary embodiment of the present invention is a method for stably detecting a target that exists in an image. An image acquisition unit may use an image captured with use of a camera, a video camera, or a network camera, or may use an image captured and stored in advance.

The present exemplary embodiment will be described based on an example that captures an image including a person, and detects a person that a user wants to detect from the acquired image. In the present exemplary embodiment, a detection target is a human, but is not limited thereto. For example, the present invention can be also employed to detection of, for example, an animal or a plant.

Figure 1:
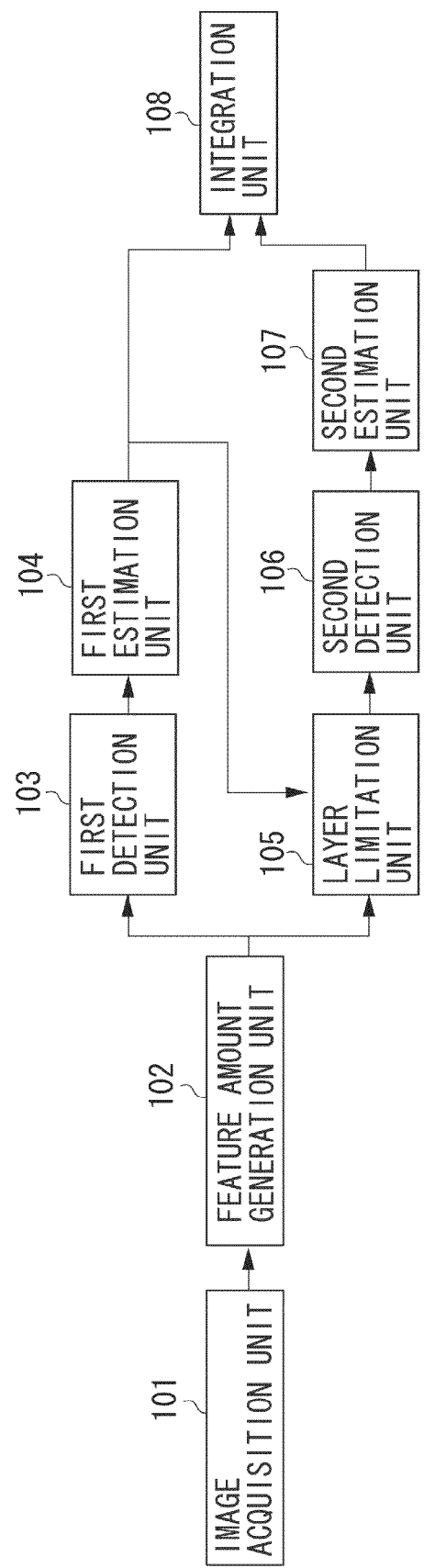
FIG. 1 illustrates a configuration of an object detection apparatus according to a first exemplary embodiment of the present invention.

FIG. 1 illustrates an outline of an object detection apparatus 100 according to the present exemplary embodiment.

As illustrated in FIG. 1, the object detection apparatus 100 according to the present exemplary embodiment includes an image acquisition unit 101, a feature amount generation unit 102, a first detection unit 103, a first estimation unit 104, a layer limitation unit 105, a second detection unit 106, a second estimation unit 107, and an integration unit 108.

The image acquisition unit 101 acquires an image from a camera or among images captured in advance. The acquired image is transmitted to the feature amount generation unit 102.

Figure 2:
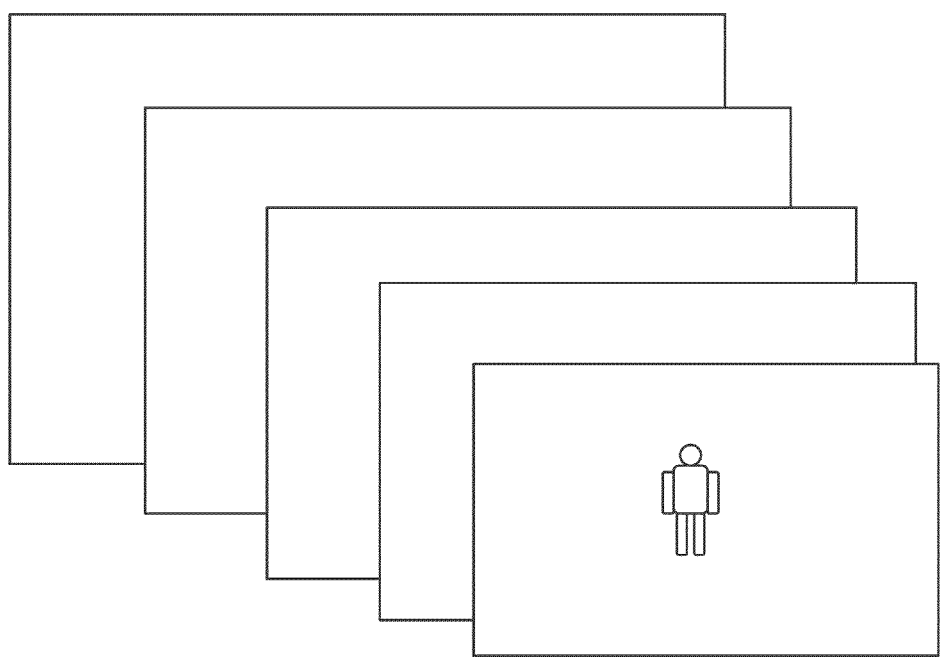
FIG. 2 illustrates a processing process in the object detection method according to the first exemplary embodiment of the present invention.

The feature amount generation unit 102 generates layer images 201 by enlarging/reducing the image acquired by the image acquisition unit 101 at predetermined scales as illustrated in FIG. 2, and generates a feature amount for each layer image. In this way, the term "layer images" refers to images generated by enlarging/reducing an image at predetermined scales. The generated feature amount may be a Histogram of Oriented Gradients (HOG) feature amount, a Haar-Like feature amount, a color feature amount, or an image generated by integrating them. The generated layer feature amount is output to the first detection unit 103 and the layer limitation unit 105.

The first detection unit 103 performs detection processing on the feature amount of each of the layer images 201, which is generated by the feature amount generation unit 102.

Figure 3:
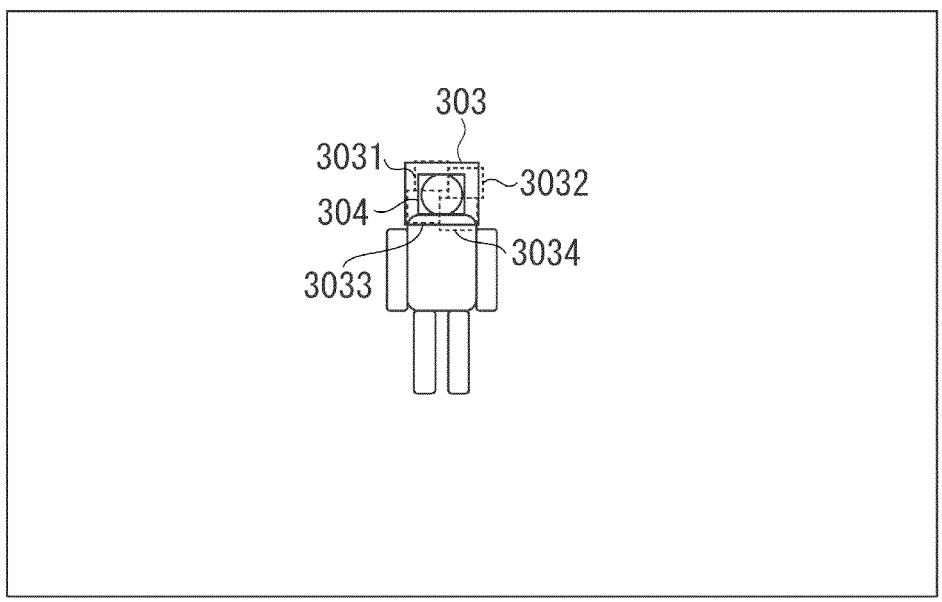
FIG. 3 illustrates a processing process in the object detection method according to the first exemplary embodiment of the present invention.

As illustrated in FIG. 3, in the present exemplary embodiment, the first detection unit 103 detects a head portion surrounding region of a person based on a feature amount of a layer image 302, which is one of the layer images 201. As will be used herein, the term "head portion surrounding region" is used to indicate a region including not only a head of a person but also even a shoulder. The detection target is not limited to the head portion surrounding region of a person, and may be an arm, a torso, a leg, or the like. Further, in the present exemplary embodiment, the detection processing is performed on a single image layer, but may be performed on more or all layer images.

As a method for detecting an object, the detection processing is performed by using a known technique such as HOG+Super Vector Machine (SVM) (a reference literature: "Histograms of Oriented Gradients for Human Detection" written by N. Dalal and presented in Computer Vision and Pattern Recognition (CVPR) 2005), Implicit ShapeModel (ISM) ("Combined Object Categorization and Segmentation with an Implicit Shape Model" written by B. Leibe and presented in European Conference on Computer Vision (ECCV) 2004), or Latent-SVM ("Object Detection with Discriminatively Trained Part Based Models" written by P. Felzenszwalb, R. Girshick, D. McAllester, and D. Ramanan, and presented in Institute of Electrical and Electronics Engineers (IEEE) Pattern Analysis and Machine Intelligence (PAMI) volume 32, number 9, 2010). The first detection unit 103 detects a result 303 from the feature amount of the layer image 302, which is one of the layer images 201.

Further, the first detection unit 103 may also perform the detection processing for detecting a region of the target object on the image acquired by the image acquisition unit 101. In this case, the first detection unit 103 performs the detection processing with use of a known technique such as pattern matching.

The detection result 303 of the head portion surrounding region, which is detected by the first detection unit 103, is transmitted to the first estimation unit 104.

The first estimation unit 104 estimates a specific part region with use of the detection result 303 acquired from the first detection unit 103. In the present exemplary embodiment, the first estimation unit 104 estimates a head portion region as the specific part region. As will be used herein, the term "head portion region" is used to indicate only a head portion, while the above-described head portion surrounding region means the region including not only a head portion but also even a shoulder. In the present exemplary embodiment, the first detection unit 103 detects the head portion surrounding region, and the first estimation unit 104 estimates only the head portion. However, needless to say, in a case where the first detection unit 103 detects another region than the head portion surrounding region, the region estimated by the first estimation unit 104 is not the head portion, too.

In the following description, a method for estimating the head portion region will be described. As a method for estimating the head portion region, the head portion region can be calculated according to the following equation (1) with use of positional coordinates of the detection result 303 of the head portion surrounding region.

$$\begin{bmatrix} \tilde{x}_1 \\ \tilde{y}_1 \\ \tilde{x}_2 \\ \tilde{y}_2 \end{bmatrix} = \begin{bmatrix} x_1 \\ y_1 \\ x_2 \\ y_2 \end{bmatrix} + Ap \qquad (1)$$

In equation (1), $x_1$ and $y_1$ represent upper left coordinates of the detection result 303, and $x_2$ and $y_2$ represent lower right coordinates of the detection result 303.

In equation (1), "A" represents a detection result expressed in the form of a matrix, which is constituted by a root filter including a region from the head portion to the shoulder, and a plurality of part filters 3031 to 3034 each expressing a part of the root filter. Further, when the detection result is converted into the matrix form, a difference is calculated between central coordinates of each of the part filters 3031 to 3034 and central coordinates of the detection result 303 at the detected position.

An x coordinate of the coordinates as the difference is normalized by a width w of the detection result region 303, and a y coordinate is normalized by a height h of the detection result 303. The normalized central coordinates x, y of the respective part filters 3031 to 3034 are expressed in the form of a matrix (a row includes the normalized coordinates of each part filter of one detection result, and a column includes each detection result), which is "A" in equation (1).

In equation (1), "p" represents a vector constituted by coefficients for linear prediction of a size of the head portion region based on a detection result from execution of detection processing on learning data, and an actual size of a head portion (an array of coefficients by which the normalized central coordinates of the respective part filters are multiplied). The term "learning data" refers to a group of images each showing a person prepared in advance.

As illustrated in FIG. 3, the first estimation unit 104 estimates the head portion region from the head portion detection result 303, and then can acquire an estimated result 304. This head portion region 304 as an estimated result is output to the layer limitation unit 105 and the integration unit 108.

The layer limitation unit 105 determines a layer where the second detection unit 106 will perform detection processing based on the feature amount generated by the feature amount generation unit 102 and the head portion region 304 estimated by the first estimation unit 104. As a determination method, the layer limitation unit 105 calculates the layer with use of equation (2).

Figure 4:
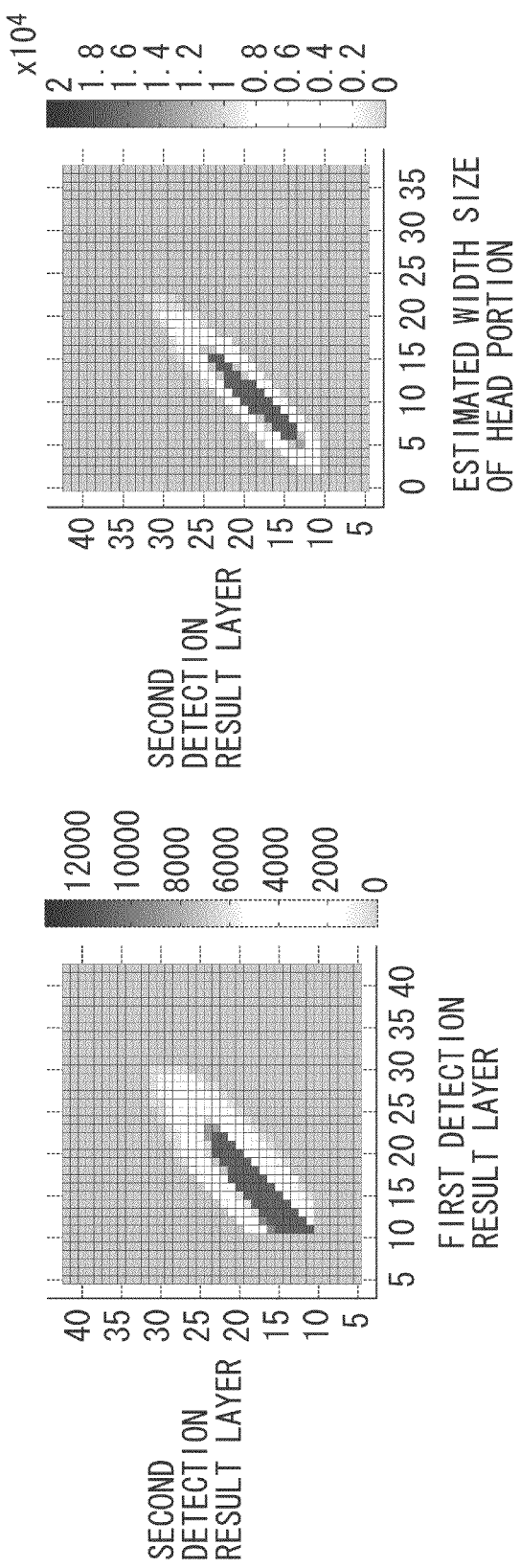
FIG. 4 illustrates a processing process in the object detection method according to the first exemplary embodiment of the present invention.

FIG. 4 illustrates a distribution chart 405 as a histogram of a detection result in which the horizontal axis corresponds to a layer of a detection result of the first detection unit 103, and the vertical axis corresponds to a layer detected by the second detection unit 106, with respect to the above-described learning data.

Further, FIG. 4 illustrates a distribution chart 406 as a histogram of a detection result in which the horizontal axis corresponds to a layer estimated by linear prediction from a width size of the head portion region estimated by the first estimation unit 104, and the vertical axis corresponds to a layer of a result detected by the second detection unit 106, with respect to the above-described learning data.

As illustrated in FIG. 4, distribution of layers suitable for detection is indicated based on a size of the head portion region, and it can be confirmed that the distribution of layers is narrowed in the chart using the head portion region estimated result. From this confirmation, coefficients coeff are calculated with use of the least-square method based on the distribution 406 acquired from the learning data.

$$\begin{bmatrix} coeff_1 \\ coeff_2 \\ coeff_3 \end{bmatrix} = A^{-1}B \quad (2)$$

In equation (2), "A" represents a matrix constituted by results from taking logarithms of head portion region sizes in the learning data, and "B" represents a matrix constituted by layers in the detection results of the second detection unit 106.

The layer is determined according to equation (3) with use of the calculated coefficients coeff.

$$Layer = coeff_1 * \log(width) + coeff_2 * \log(height) + coeff_3 \quad (3)$$

In equation (3), "width" represents a width of the head portion region, and "height" represents a height of the head portion region.

Detection processing is performed only on the feature amount of a layer image 507, which coincides with or is the closest to the layer acquired from equation (3), and detection processing is not performed on the feature amounts of layers 509, which are other layers than the layer image 507.

The limited layer image 507 is output to the second detection unit 106.

The second detection unit 106 performs the detection processing only on the feature amount of the limited layer image 507 based on the feature amount generation unit 102 and the layer limitation unit 105. The present exemplary embodiment detects the entire body of a person. Needless to say, a target detected by the second detection unit 106 is not limited to the entire body of a person.

As a detection processing method, the detection processing is performed at each position by sliding a window of a model 508, which is learned in advance with use of a learning method such as SVM or Boosting.

Figure 6:
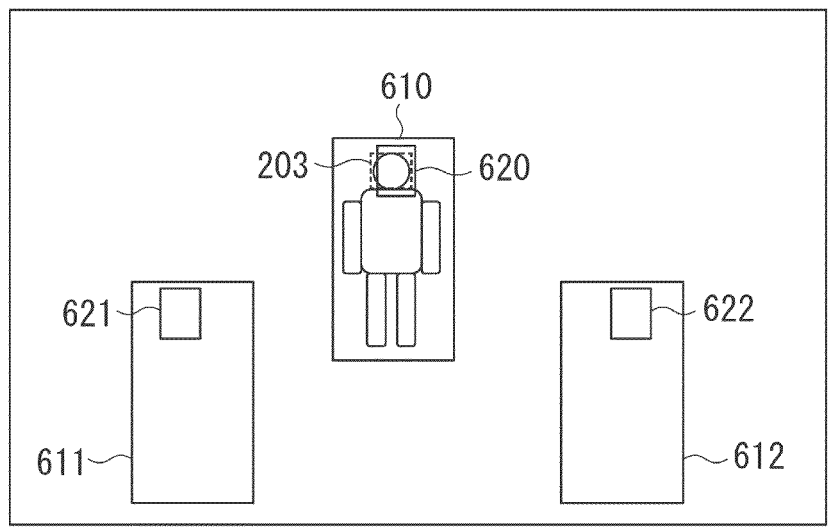
FIG. 6 illustrates a processing process in the object detection method according to the first exemplary embodiment of the present invention.

As illustrated in FIG. 6, detection results 610 to 612 are acquired from the detection processing. The acquired detection results 610 to 612 are output to the second estimation unit 107.

The second estimation unit 107 estimates the specific part region from each of the detection results 610 to 612 expressed as rectangular regions acquired by the second detection unit 106. In the present exemplary embodiment, the second estimation unit 107 estimates the head portion region as the specific part. Needless to say, the specific part estimated by the second estimation unit 107 is not limited to the head portion region, but should be the same as the region estimated by the first estimation unit 104. This is because the integration unit 108, which will be described below, integrates the region estimated by the first estimation unit 104 and the region estimated by the second estimation unit 107.

As an estimation method, the specific part region can be calculated with use of equation (1) used by the first estimation unit 104. As illustrated in FIG. 6, head portion regions 620 to 622 expressed as calculated rectangular regions are output to the integration unit 108.

The integration unit 108 integrates a head portion region 203 acquired by the first estimation unit 104, and the head portion regions 620 to 622 acquired by the second estimation unit 107, and outputs a final detection result.

As an integration method, the integration unit 108 calculates an overlap ratio between the head portion region 203 and each of the head portion regions 620 to 622, and selects the head portion region having the highest overlap ratio as a frame from which the same target is detected.

As illustrated in FIG. 6, the head portion region 203 has the highest overlap ratio with the head portion region 620, so that these two detection results are selected as a combination, and the detection result 610 is output as a final detection result. The detection results 611 and 612 are determined as false detection, and, therefore, are not output.

The present exemplary embodiment is configured in this way.

Figure 7:
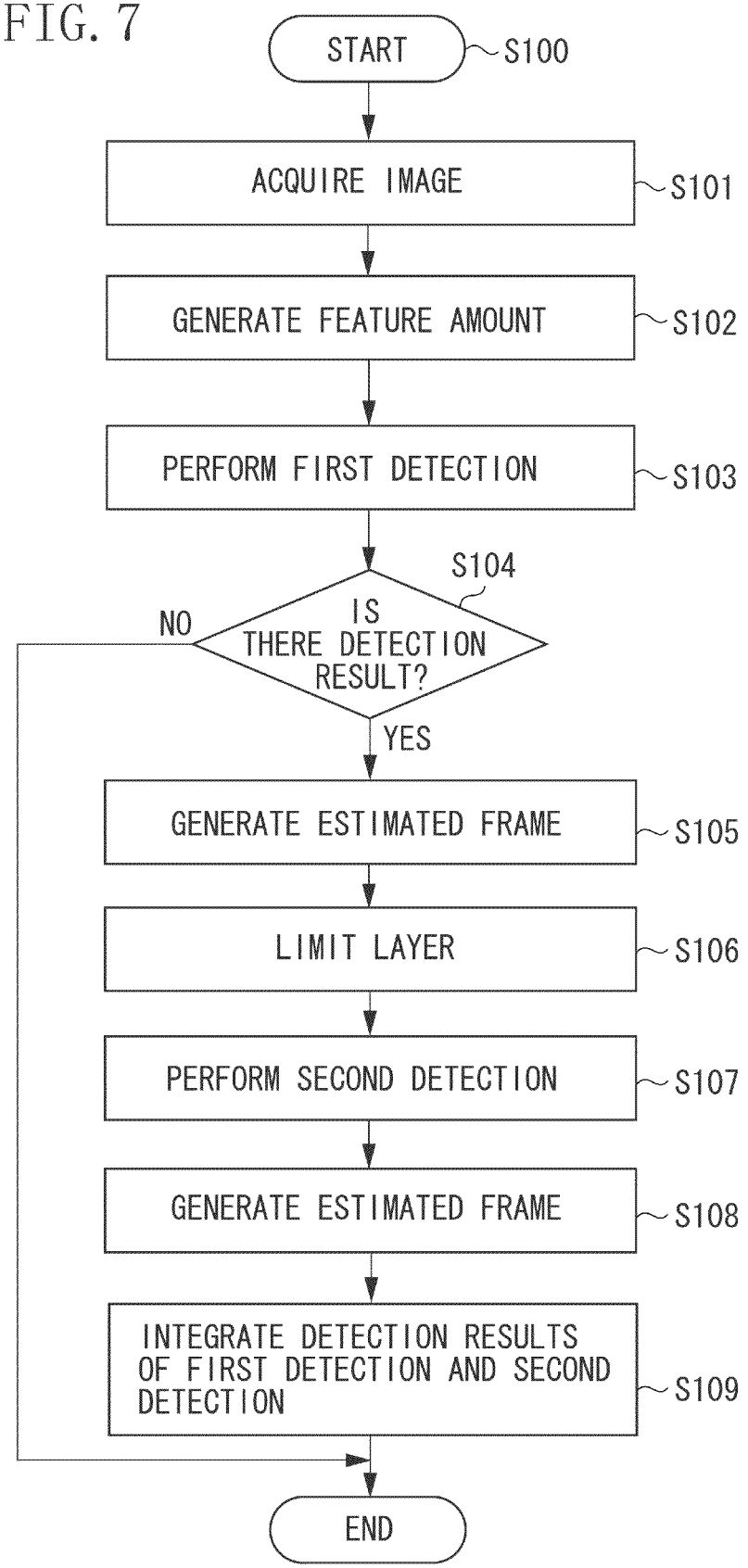
FIG. 7 is a flowchart illustrating processing processes in the object detection method according to the first exemplary embodiment of the present invention.

Subsequently, processing performed by the object detection apparatus 100 according to the present exemplary embodiment will be described with reference to a flowchart illustrated in FIG. 7. A program code according to this flowchart is stored in a not-illustrated memory such as a random access memory (RAM) or a read only memory (ROM) in the method according to the present exemplary embodiment, and is read out and executed by a not-illustrated central processing unit (CPU) or the like.

In step S100, the entire process sing is started. First, the processing proceeds to step S101, in which the image acquisition unit 101 acquires an image from, for example, a camera or an image file. The acquired image is transmitted to the feature amount generation unit 102. Then, the processing proceeds to step S102.

In step S102, the feature amount generation unit 102 generates the layer images 201 by performing image enlargement/reduction processing on the image acquired by the image acquisition unit 101, and generates a feature amount for each layer image.

The generated feature amount may be an HOG feature amount, a Haar-Like feature amount, or a color feature amount.

As a result of this processing, a layer feature amount can be acquired. The generated feature amount is output to the first detection unit 103 and the layer limitation unit 105. Then, the processing proceeds to step S103.

In step S103, the first detection unit 103 performs the detection processing. The first detection unit 103 performs the detection processing on the feature amount of the layer image 302, which is one of the feature amounts of the layer images 201.

Alternatively, the first detection unit 103 may perform the detection processing on the generated feature amounts of the layer images 201, or may perform the detection processing on the image acquired by the image acquisition unit 101 by, for example, pattern matching.

As a detection method, the first detection unit 103 uses a known technique such as HOG+SVM. or ISM. Further, in the present exemplary embodiment, the first detection unit 103 detects the head portion region of a person. However, the present invention is not limited thereby. The detection result 303 acquired from the detection processing is output to the first estimation unit 104. Then, the processing proceeds to step S104.

In step S104, it is determined whether the first detection result can be acquired. If there is no detection result (NO in step S104), the processing ends. If there is the detection result 303 (YES in step S104), the processing proceeds to step S105.

In step S105, the first estimation unit 104 estimates the specific part region from the detection result 303 acquired from the first detection unit 103.

In the present exemplary embodiment, the first estimation unit 104 estimates the head portion region as the specific part. However, in the present invention, the specific part region is not limited to the head portion region. The first estimation unit 104 estimates the head portion region 304 from the detection result 303 with use of the equation (1).

After completion of the entire head region estimation processing, the acquired head portion region 304 is output to the layer limitation unit 105 and the integration unit 108. Then, the processing proceeds to step S106.

In step S106, the layer limitation unit 105 limits a layer where the second detection unit 106 will perform the detection processing on the feature amount generated by the feature amount generation unit 102, with use of the head portion region 304 estimated by the first estimation unit 104.

As a method for limiting the layer, the layer limitation unit 105 calculates coefficients with use of equation (2) while setting a final result generated by integrating the results of the first estimation unit 104 and the second estimation unit 107 as the learning data, and calculates a layer from linear prediction of the head portion frame and the coefficients according to equation (3).

Figure 5:
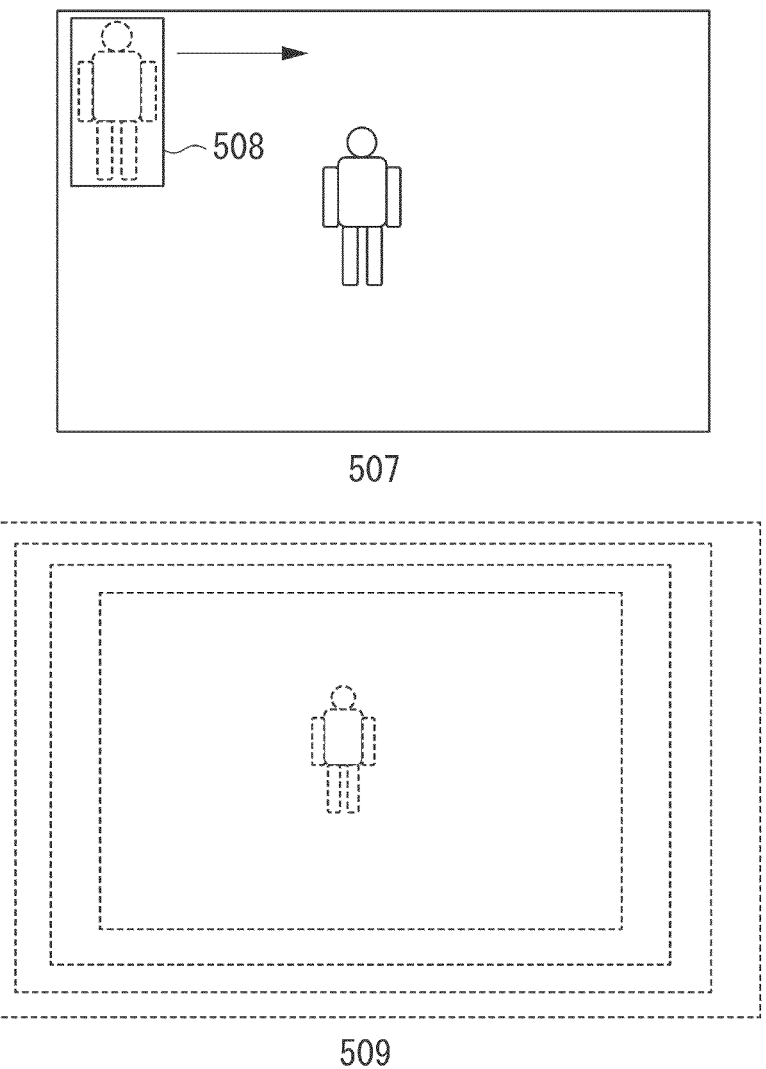
FIG. 5 illustrates a processing process in the object detection method according to the first exemplary embodiment of the present invention.

As a result, it is possible to determine a feature amount of a layer most suitable for the detection processing by the second detection unit 106. As illustrated in FIG. 5, the feature amount of the layer image 507 for which the detection processing is performed, and the feature amounts of the layer images 509 for which the detection processing is not performed are separated according to the determined layer. Then, the processing proceeds to step S107.

In step S107, the second detection unit 106 performs the detection processing.

As a detection method, the detection processing is performed at each position by sliding the window of the model 508, which is learned in advance with use of a learning method such as SVM or Boosting. Further, in the present exemplary embodiment, the model detects the entire body of a person, but the present invention is not limited thereby.

As illustrated in FIG. 6, the detection results 610 to 612 are acquired from the detection processing of the second detection unit 106. The detection results 610 to 612 are output to the second estimation unit 107. Then, the processing proceeds to step S108.

In step S108, the second estimation unit 107 estimates a specific part from each of the detection results 610 to 612 acquired from the second detection unit 106.

In the present exemplary embodiment, the second estimation unit 107 estimates the head portion region as the specific part, but the present invention is not limited thereby. As a method for estimating the head portion region, the second estimation unit 107 performs the estimation with use of the equation (1) used by the first estimation unit 104.

As illustrated in FIG. 6, the head portion region estimated results 620 to 622 estimated by the second estimation unit 107 are acquired. The acquired head portion region estimated results 620 to 622 are output to the integration unit 108. Then, the processing proceeds to step S109.

In step S109, the integration unit 108 integrates the head portion region 203 estimated by the first estimation unit 104, and the head portion regions 620 to 622 estimated by the second estimation unit 107.

As an integration processing method, the integration unit 108 calculates an overlap ratio between the head portion region 203 and each of the head portion regions 620 to 622, and selects the result of the combination achieving the highest overlap ratio as the head portion frame from which the same target is detected.

As illustrated in FIG. 6, the head portion region 203 has the highest overlap ratio with the head portion frame 620, so these two estimated frames are selected as a combination, and the detection result 610 is output as a final detection result. Further, the detection results 611 and 612 are processed as false detection by the integration unit 108.

Then, the entire processing ends.

Figure 8:
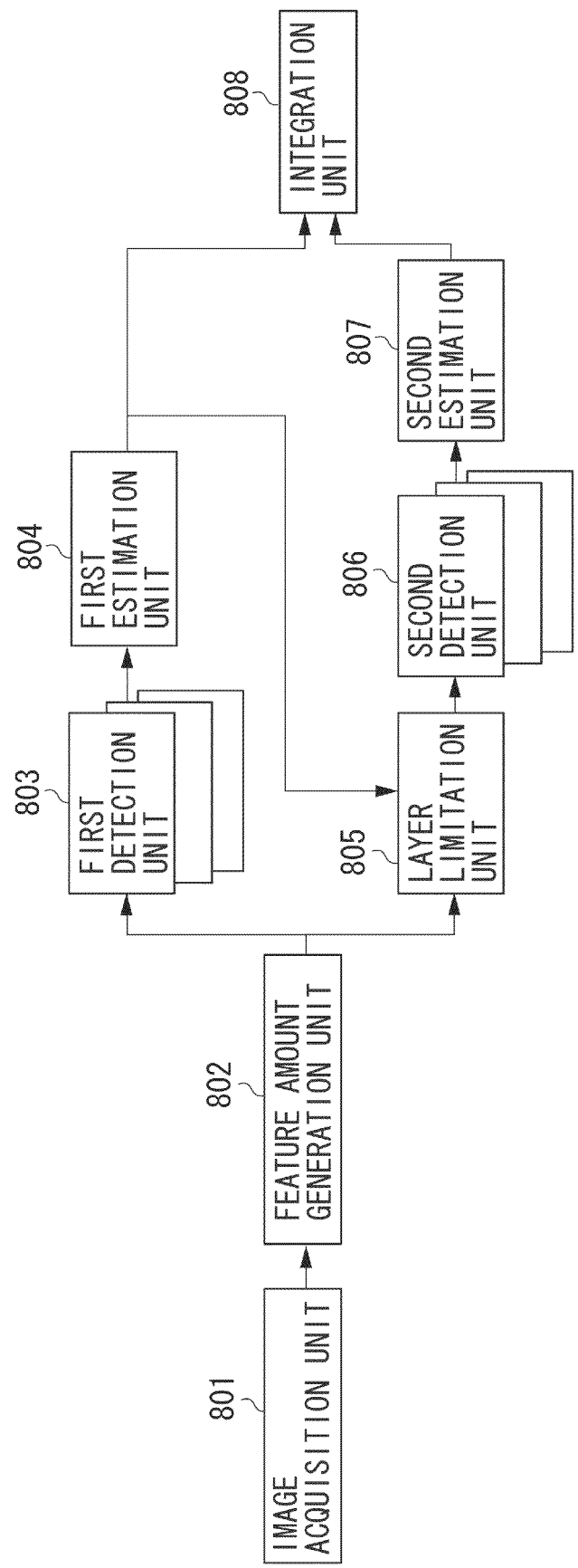
FIG. 8 illustrates a configuration of an object detection apparatus according to a second exemplary embodiment of the present invention.
Figure 9:
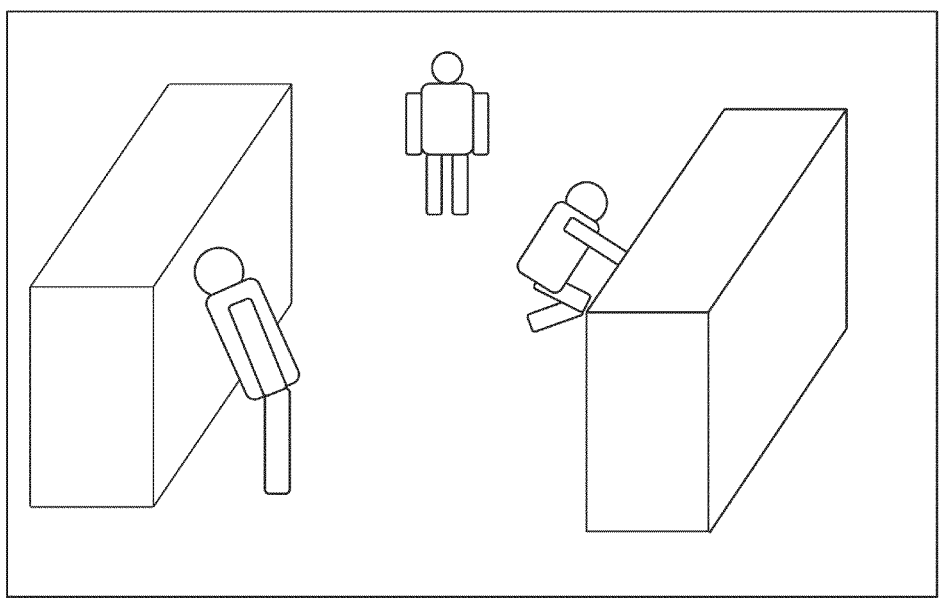
FIG. 9 illustrates a processing process in the object detection method according to the second exemplary embodiment of the present invention.

FIG. 8 illustrates an outline of an object detection apparatus 800 according to a second exemplary embodiment of the present invention.

As illustrated in FIG. 8, the object detection apparatus 800 includes an image acquisition unit 801, a feature amount generation unit 802, a first detection unit 803 having a plurality of detection models, a first estimation unit 804, a layer limitation unit 805, a second detection unit 806 having a plurality of detection models, a second estimation unit 807, and an integration unit 808.

The image acquisition unit 801 acquires an image 901 from a camera or among images captured in advance. The acquired image 901 is transmitted to the feature amount generation unit 802.

Figure 10:
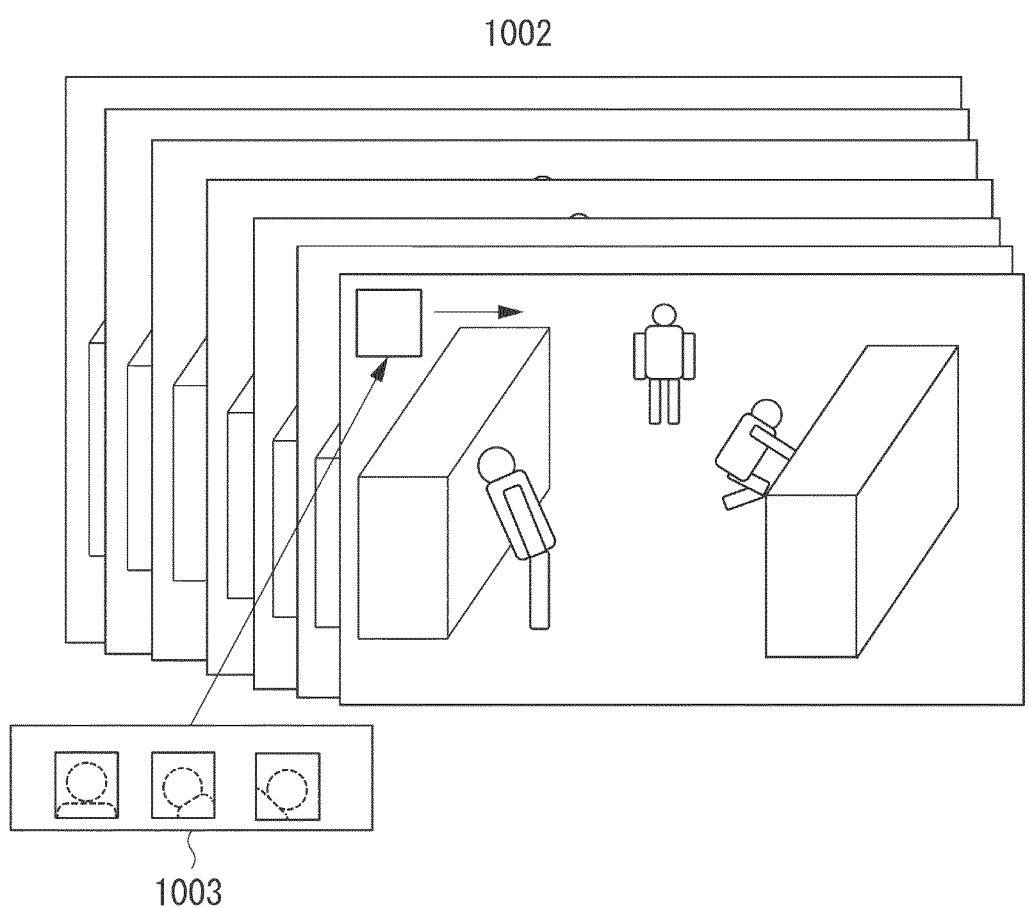
FIG. 10 illustrates a processing process in the object detection method according to the second exemplary embodiment of the present invention.

The feature amount generation unit 802 generates layer images 1002 by performing enlargement/reduction processing on the image 901 acquired by the image acquisition unit 801 at predetermined scales as illustrated in FIG. 10, and generates a feature amount for each layer of the layer images 1002. The generated feature amount may be a HOG feature amount, a Haar-Like feature amount, or a color feature amount.

The generated layer feature amount is output to the first detection unit 803 and the layer limitation unit 805.

The first detection unit 803 performs detection processing on the feature amount. As illustrated in FIG. 10, the first detection unit 803 has a plurality of person's head portion regions as models, and performs detection processing at each position by sliding a window of each model on the feature amount of a layer image 1001, thereby detecting a region of a target object. In the present exemplary embodiment, the first detection unit 803 detects a head portion surrounding region of a person. As will be used herein, the term "head portion surrounding region" is used to indicate a region including not only a head of a person but also even a shoulder. The detection target is not limited to the head portion surrounding region of a person, and may be an arm, a torso, a leg, or the like.

The head portion region is detected with use of the known technique described in the description of the first exemplary embodiment.

The first detection unit 803 detects results 1104 to 1106 in the feature amount of the layer image 1001. The detection results 1104 to 1106 are transmitted to the first estimation unit 804.

The first estimation unit 804 estimates a specific part region based on the detection results 1104 to 1106 of the head portion surrounding region, which are acquired by the first detection unit 803. In the present exemplary embodiment, the first estimation unit 804 estimates a head portion region, but the present invention is not limited thereby.

As a method for estimating the head portion region, the head portion region can be acquired according to the following equation (4) with use of positional coordinates of the detection result of the first detection unit 803.

$$\begin{bmatrix} \tilde{x}_1 \\ \tilde{y}_1 \\ \tilde{x}_2 \\ \tilde{y}_2 \end{bmatrix} = \begin{bmatrix} x_1 \\ y_1 \\ x_2 \\ y_2 \end{bmatrix} + Ap_m \quad (4)$$

In equation (4), $x_1$ and $y_1$ represent upper left coordinates of the detection result, and $x_2$ and $y_2$ represent lower right coordinates of the detection result.

In equation (4), "A" represents a matrix converted from values resulting from normalization of upper left coordinates and lower right coordinates of part filters in a single detection result based on the central coordinates and size of a root filter. Further, "$p_m$" represents a vector constituted by coefficients ("m" represents a model number) acquired from learning. At this time, parameters of $p_m$ are calculated for each model by performing the least-square method on learning data having a head portion frame as a correct answer and a frame of the second detection unit 806 as a set.

Figure 11:
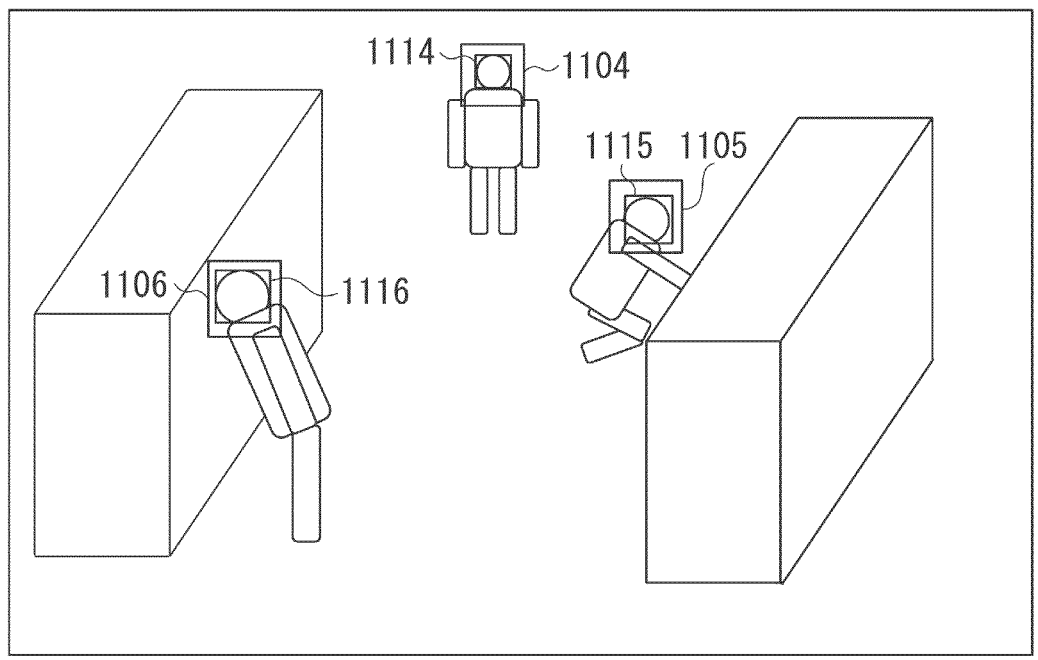
FIG. 11 illustrates a processing process in the object detection method according to the second exemplary embodiment of the present invention.

As illustrated in FIG. 11, head portion region estimated results 1114 to 1116 are estimated from the head portion region detection results 1104 to 1106. These head portion region estimated results 1114 to 1116 are output to the layer limitation unit 805 and the integration unit 808.

The layer limitation unit 805 determines layers where the second detection unit 806 will perform detection processing on the feature amounts of the layer images 1002 based on the head portion regions 1114 to 1116 estimated by the first estimation unit 804.

Figure 12:
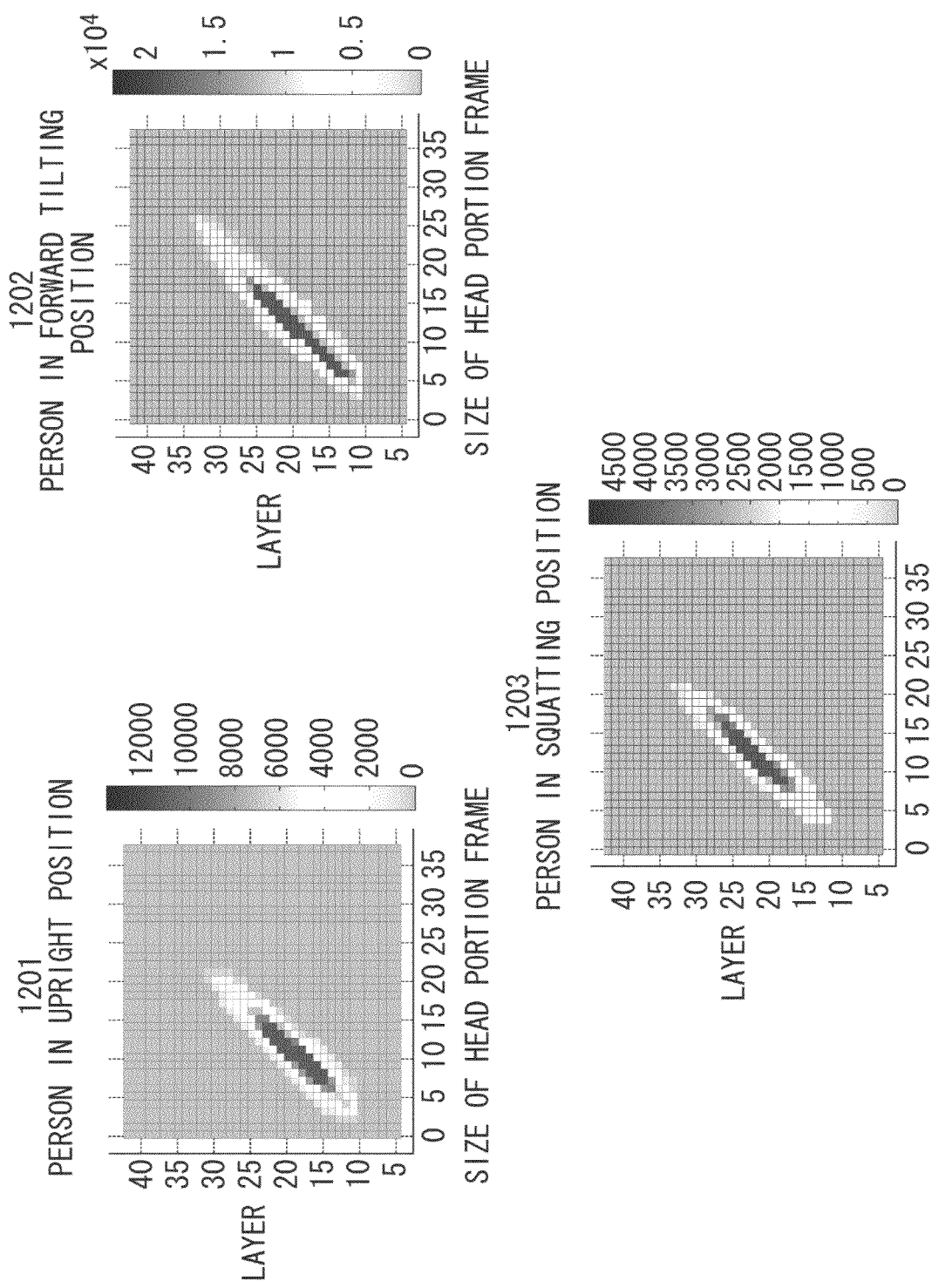
FIG. 12 illustrates a processing process in the object detection method according to the second exemplary embodiment of the present invention.

FIG. 12 illustrates distributions in final detection results output from the integration unit 108 with respect to the learning data, each indicating a size of the head portion region at that time and a layer corresponding to a feature amount from which the result output from the second detection unit 806 is detected.

The distribution 1201 indicates the entire body of a person in an upright position. The distribution 1202 indicates the entire body of a person in a forward tilting position. The distribution 1203 indicates the entire body of a person in a squatting position. In a case where postures are different in this way, different layers are suitable for estimation from the size of the head portion region. Therefore, coefficients are learned by the least-square method for each model, and are calculated according to equation (5).

$$\begin{bmatrix} coeff_{1m} \\ coeff_{2m} \\ coeff_{3m} \end{bmatrix} = A_m^{-1} B_m \quad (5)$$

In equation (5), "$A_m$" represents a matrix constituted by results from taking logarithms of sizes of the head portion frame in the learning data for each model, and "$B_m$" represents a matrix constituted by layers in the detection results of the second detection unit 806 for each model.

The layer where detection will be performed is calculated according to equation (6) with use of the calculated coefficients.

$$Layer_m = coeff_{1m} * \log(width) + coeff_{2m} * \log(height) + coeff_{3m} \quad (6)$$

It is possible to determine a layer most suitable for detection processing that the second detection unit 806 will perform by calculating a weighted sum of coefficients for this head portion region. As illustrated in FIG. 13, layers 1307 where the detection processing is performed, and layers 1308 where the detection processing is not performed are separated according to the determined layers 1307.

The second detection unit 806 performs the detection processing only on the limited layer images 1307 based on the feature amount generation unit 802 and the layer limitation unit 805.

As illustrated in FIG. 13, as a detection processing method, the processing is performed at each position by sliding a window of each model 1309, which is learned in advance with use of a learning method such as SVM or Boosting. In the present exemplary embodiment, the model detects the entire body of a person, but the present invention is not limited thereby.

Figure 14:
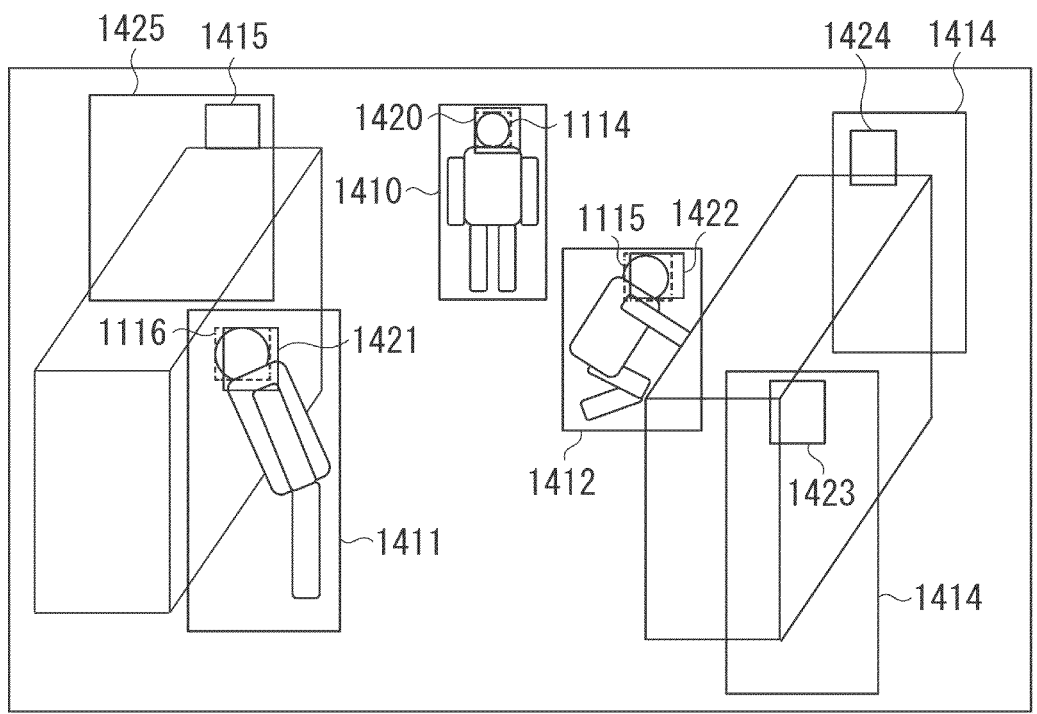
FIG. 14 illustrates a processing process in the object detection method according to the second exemplary embodiment of the present invention.

Further, in the present exemplary embodiment, for example, the second detection unit 806 detects a person in an upright position with use of some model, and detects a person in a squatting position with use of another model. In this way, the second detection unit 806 can detect a person's body corresponding to a posture change using different models. As illustrated in FIG. 14, detection results 1410 to 1415 of person's entire bodies having different postures are acquired by the detection processing. The acquired detection results 1410 to 1415 are output to the second estimation unit 807.

The second estimation unit 807 estimates a specific part region from the detection results 1410 to 1415 acquired from the second detection unit 806. In the present exemplary embodiment, the second estimation unit 807 estimates a head portion region, but the present invention is not limited thereby. Needless to say, the specific part estimated by the second estimation unit 807 is not limited to the head portion region, but should be the same as the region estimated by the first estimation unit 804. This is because the integration unit 808, which will be described below, integrates the region estimated by the first estimation unit 804 and the region estimated by the second estimation unit 807.

As an estimation method, the second estimation unit 807 estimates the head portion region for each model with use of equation (4), which is used by the first estimation unit 804. As a result, acquired head portion regions 1420 to 1425 are output to the integration unit 808.

The integration unit 108 integrates the head portion regions 1114 to 1116 of the first estimation unit 804 and the head portion regions 1420 to 1425 of the second estimation unit 807, in a similar manner to the first exemplary embodiment. Finally, in the present exemplary embodiment, the regions 1410, 1411, and 1412 are output as a final detection result.

The present exemplary embodiment is configured in this way.

Figure 15:
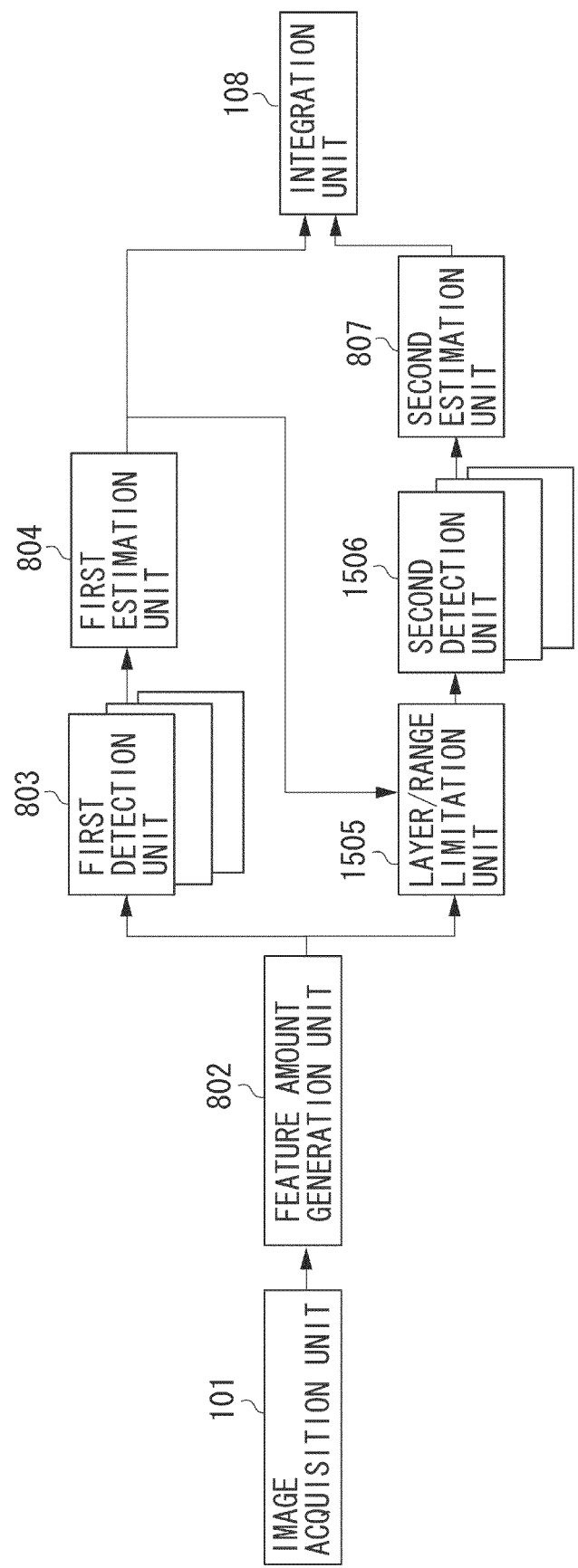
FIG. 15 illustrates a configuration of an object detection apparatus according to a third exemplary embodiment of the present invention.

FIG. 15 illustrates an outline of an object detection apparatus 1500 according to a third exemplary embodiment of the present invention.

As illustrated in FIG. 15, the object detection apparatus 1500 includes the following units. The object detection apparatus 1500 includes the image acquisition unit 101, the feature amount generation unit 802, the first detection unit 803 having a plurality of detection models, the first estimation unit 804, a layer/range limitation unit 1505, a second detection unit 1506 having a plurality of detection models, the second estimation unit 807, and the integration unit 108.

In the present exemplary embodiment, after the layer/range limitation unit 1505 limits a layer and a detection processing range for each of models to be used by the second detection unit 1506, the second detection unit 1506 performs detection processing according to this limitation. The layer/range limitation unit 1505 determines a feature amount of a layer image where detection will be performed for each model based on the estimated size and the position of the head portion acquired from the first estimation unit 804.

First, the layer/range limitation unit 1505 calculates a layer with use of the equation (6) to calculate a layer image 1601 for a person in an upright position.

Next, the layer/range limitation unit 1505 determines a detection processing range 1604 from a position 1602 of a head portion estimated region and a filter size of a model 1603 so as to allow a thorough search in a range including the filter of the model 1603 above, below, to the right of, and to the left of the head portion estimated position 1602 with the head portion estimated position 1602 set as a center. At this time, the detection processing range 1604 may be stored in a memory as a region, or may be held as a map in which the interior of the detection processing range 1604 is labeled.

The second detection unit 1506 performs detection processing with use of only the model corresponding to the determined detection processing range 1604.

Similarly, for a person in a squatting position, the layer/range limitation unit 1505 focuses on a feature amount of a layer image 1605, and determines a detection processing range 1608 from a position of a head portion region 1606 and a size of a model 1607. For a person in a forward tilting position, the layer/range limitation unit 1505 also focuses on a feature amount of a layer image 1609, and determines a detection processing range 1612 from a position of a head portion region 1610 and a size of a model 1611.

According to this configuration, it is possible to further speed up the entire detection processing.

Various kinds of exemplary embodiments have been described above as the first to third exemplary embodiments, but all of them are only one example of the following configuration. Other embodiments based on the following configuration are also within the scope of the present invention.

An image including a target object is acquired (an image acquisition step). Then, the image is enlarged/reduced at a plurality of different magnifications to generate layer images (a layer image generation step). Then, a region of at least a part of the target object is detected based on the layer images (a first detection step). Then, a first specific part region is estimated based on a first detected region detected in the first detection step (a first estimation step). Then, a layer of the layer images is limited based on the first specific part region and learning data learned in advance (a layer limitation step). Then, a region of at least a part of the target object is detected in the layer image of the layer limited in the layer limitation step (a second detection step). Then, a second specific part region is estimated based on a second detected region detected in the second detection step (a second estimation step). Then, an estimated result estimated in the first estimation step and an estimated result estimated in the second estimation step are integrated to determine an integration result as a specific part region of the target object (an integration step).

Having described exemplary embodiments in detail, the present invention can be embodied in the form of, for example, a system, an apparatus, a method, a program, or a storage medium. In particular, the present invention may be employed to a system constituted by a plurality of devices, or may be employed to an apparatus constituted by a single device.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-082379 filed Mar. 30, 2012, which is hereby incorporated by reference herein in its entirety.

What is claimed is:

1. An object detection method comprising the steps of:
   acquiring an image including a target object;
   generating a plurality of layer images by one or both of enlarging and reducing the image at a plurality of different scales;
   detecting a region of at least a part of the target object as a first detected region from at least one of the layer images;
   estimating a first estimated region based on the first detected region;
   selecting at least one of the layer images based on the estimated first estimated region;
   detecting a region of at least a part of the target object in the selected layer image different from the first detected region as a second detected region;
   estimating a second estimated region based on the second detected region; and
   integrating the first estimated region and the second estimated region,
   wherein the first estimated region is estimated based on coordinates and a size of the detected first detected region; and
   the second estimated region is estimated based on coordinates and a size of the detection result of the second detected region.

2. The object detection method according to claim 1, wherein the first estimated region and the second estimated region are integrated based on an overlap degree between the first estimated region and the second estimated region.

3. The object detection method according to claim 1, wherein a feature amount for each of the layer images is generated when the layer image is generated.

4. The object detection method according to claim 3, wherein the first detected region is detected based on the feature amount.

5. The object detection method according to claim 4, wherein the second detected region is detected by performing detection at each position by sliding a window of each model which is learned in advance.

6. The object detection method according to claim 1, wherein the first detected region and the second detected region are detected by performing detection with use of respectively different models.

7. The object detection method according to claim 1, wherein at least one of the layer images is selected based on a position of the first estimated region and a size of a model used by detecting the second detected region.

8. The object detection method according to claim 1, wherein the first detected region includes a head portion, and the second detected region includes a body of a person.

9. The object detection method according to claim 1, wherein the region of the target object is determined based on an integrated result of the first estimated region and the second estimated region.

10. The object detection method according to claim 1, further comprising a step of outputting a detection result of the target object based on an integrated region.

11. An object detection apparatus comprising:
an image acquisition unit configured to acquire an image including a target object;
a layer image generation unit configured to generate layer images by one or both of enlarging and reducing the image at a plurality of different scales;
a first detection unit configured to detect a region of at least a part of the target object from at least one of the layer images as a first detected region;
a first estimation unit configured to estimate a first estimated region based on the first detected region;
a selection unit configured to select at least one of the layer images based on the detected first estimated region;
a second detection unit configured to detect a region of at least a part of the target object in the layer image of the layer selected by the selection unit as a second detected region;
a second estimation unit configured to estimate a second estimated region based on the second detected region; and
an integration unit configured to integrate the first estimated region and the second estimation region,
wherein the first estimated region is estimated based on coordinates and a size of the detected first detected region; and
the second estimated region is estimated based on coordinates and a size of the detection result of the second detected region.

12. A non-transitory computer readable storage medium storing a program that causes a computer to perform the object detection method according to claim 1.

* * * * *